A. C. MILLER.
TRANSMISSION PEDAL.
APPLICATION FILED NOV. 22, 1919.

1,410,495.

Patented Mar. 21, 1922.

INVENTOR.
Adam C. Miller.
BY Victor J. Evans,
ATTORNEY.

UNITED STATES PATENT OFFICE.

ADAM C. MILLER, OF NEW YORK, N. Y.

TRANSMISSION PEDAL.

1,410,495.  Specification of Letters Patent.  Patented Mar. 21, 1922.

Application filed November 22, 1919. Serial No. 340,029.

*To all whom it may concern:*

Be it known that I, ADAM C. MILLER, a citizen of the United States, residing at New York, in the county of New York and State of New York, have invented new and useful Improvements in Transmission Pedals, of which the following is a specification.

This invention relates to transmission pedals and more particularly to a device of the character which embodies a brake shaft and a construction by which adjustment may be effected to compensate the wear of parts, readily, effectually and conveniently.

The chief object of this invention is the production of a device whose construction makes it particularly applicable for correlation with the transmission means of a Ford automobile to be used in lieu of either the brake or reverse pedal means now in use upon the particular automobile mentioned.

In the drawing:—

Figure 1:
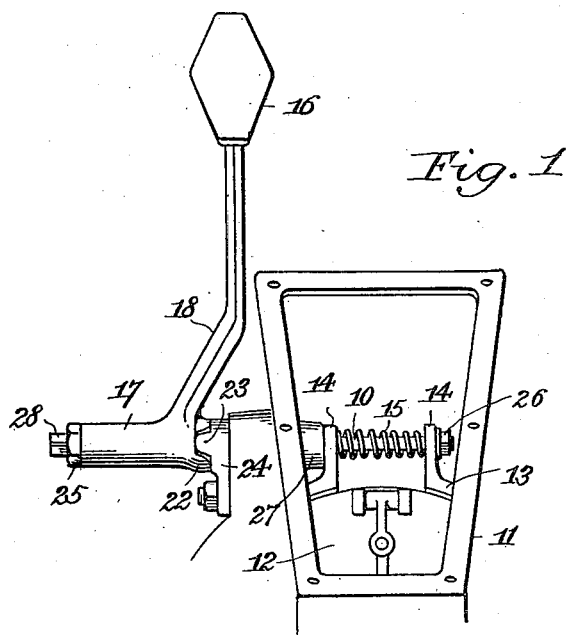
Figure 1, is an elevation showing the application of the present invention.
Figure 2:
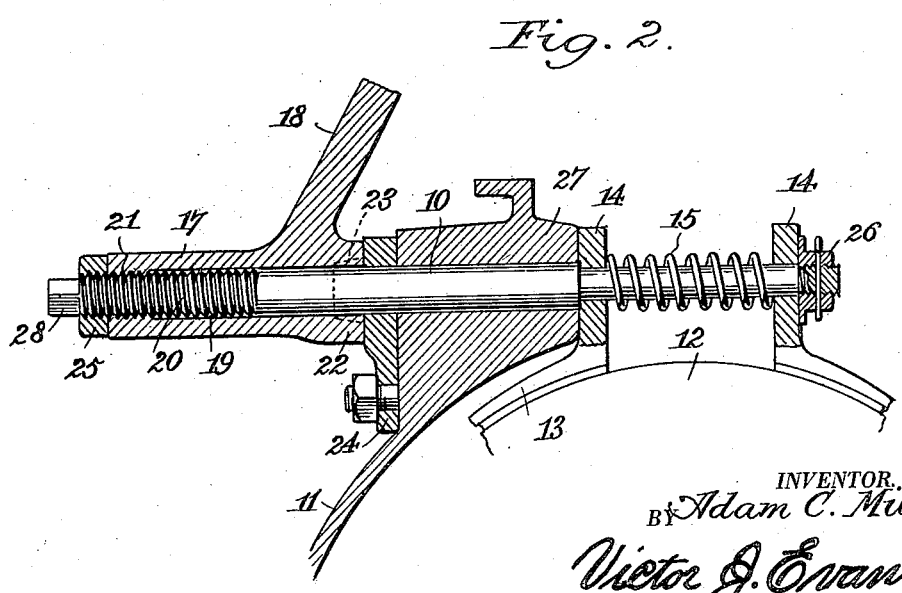
Figure 2, is a central longitudinal sectional view showing more clearly the relative disposition and construction of parts.

Referring now to the drawing, it will be seen, and it is to be understood that the device herein disclosed is principally intended to be used in correlation with other constituents of a brake means, which like other brake devices has parts thereof subject to wear, but which, without the present invention cannot be conveniently and effectually adjusted to compensate for such wear of parts.

In the present application of the invention, there is shown by way of illustration other well-known parts. Upon reference to the drawing, it will be seen, that the device consists of a shaft 10 which extends through one wall of the transmission case 11, in which case is arranged the transmission means of the automobile engine, which means includes a brake drum 12, brake band 13, which has ears 14. One end of the shaft 10 extends through openings in the ears 14 and interposed between the ears 14 there is a spring 15. The spring 15 has a normal tendency to hold the brake lining of the brake band away from the brake drum as will be understood.

In order to effect a braking action, there is provided a foot pedal 16 which is provided with a shaft encircling portion 17, formed or otherwise secured to the pedal extremity 18. The portion 17, has a bore 19 which is substantially the same size as the diameter of the threaded end 20 of the shaft. The portion 17 is internally threaded as at 21 which threads co-act with the threaded portion 20 of the shaft for effecting the adjustment. The extremity 18 of the pedal is provided with cam surfaces 22 which co-act with cam surfaces 23 on a member 24 secured to the transmission case 11. An adjusting nut 25 serves to hold the pedal 16 upon the shaft 10, while the nut 26 and the boss 27 formed on the case 11 serve to maintain and to limit the extent of separation of the ears 14 of the brake band. It will therefore be understood, that by virtue of the movement of the pedal 16 and the cam surfaces 22 and 23, the brake band may be put into braking action.

In order that wear of the parts especially the wear to the brake band lining may be compensated, adjustment of the parts is effected by loosening the nut 25 and then imparting turning movement to the shaft 10 in the proper direction which causes a relative change in the disposition of the portion 17 of the pedal with respect to the shaft 10 as will be understood. In this particular case the wear of the brake band lining is not only compensated, but the proper disposition of the cam surfaces 22 and 23 may be maintained. The extreme end of the portion 20 of the shaft is provided with a manipulating part 28 so that the shaft may be readily turned by the use of a suitable tool for effecting the desired adjustment.

What is claimed as new is:—

1. The combination of a rotatable shaft, a foot pedal having a shaft encircling portion, and means between the shaft and the shaft encircling portion for effecting the adjustment of said foot pedal on said shaft.

2. The combination of a rotatable shaft, a foot pedal having a shaft encircling portion, means embodied by the shaft and means embodied by the shaft encircling portion for effecting a fixed adjustment of the foot pedal on said shaft.

3. The combination of a slidable and turnable threaded brake shaft, a foot pedal having a shaft encircling portion which is provided with bores one of said bores having threads for threading engagement with threads on said shaft to effect adjustment for the pedal thereof, cam surfaces on the pedal and means for holding the pedal on the shaft.

4. The combination with a transmission case and brake band having relatively separable ends, of an adjustable shaft operatively connected with said ends, an active regulating or adjusting extension formed as part of the shaft and located externally of the case, a treadle mounted on said extension, means on the treadle and means on the shaft, the latter means coacting with the former means to hold the shaft in different positions of adjustment, the shaft serving to move said ends of the brake band relatively as and for the purpose specified.

In testimony whereof I hereby affix my signature.

ADAM C. MILLER.